P. Emmons,
Cracker Machine,
Nº 11,418. Patented Aug. 1, 1854.
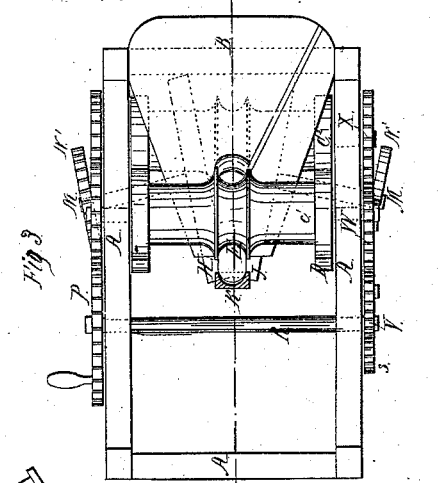
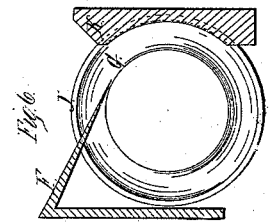
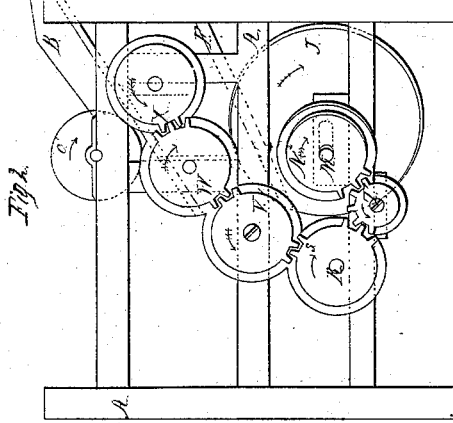
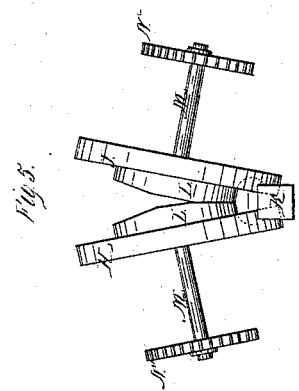
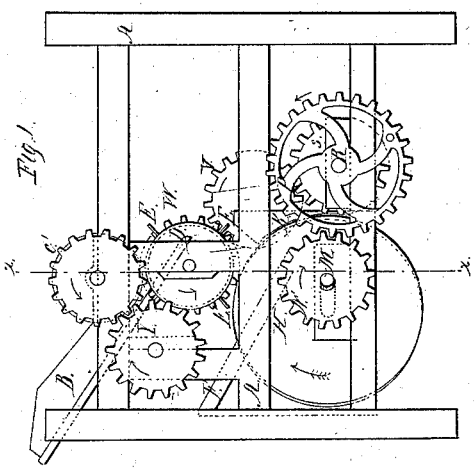
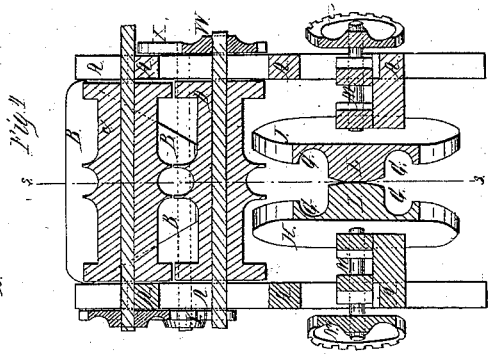

UNITED STATES PATENT OFFICE.

PHINEAS EMMONS, OF NEW YORK, N. Y.

MACHINE FOR MOLDING CRACKERS.

Specification of Letters Patent No. 11,418, dated August 1, 1854.

*To all whom it may concern:*

Be it known that I, PHINEAS EMMONS, of the city, county, and State of New York, have invented a new and Improved Machine for Working and Molding Dough for Crackers and other Purposes; and I do hereby declare the following to be a full and clear description of the same.

The nature of my invention consists in, first, arranging a set of feed rollers, having semi-circular channels transversely of their axis and matching together, so as to form or cut a cylindrical strip of dough as it passes between them, in combination with a third roller (made like the foregoing) a little lower down than the lower feed roller, and in front of it, so as to form a continuation of the channel way for the cylindrical strip of dough and for cutting the same into short lengths, suitable for crackers, by means of a series of cutters placed in its channel way and operating on the strip of dough as it is fed through the rollers; second, the use and arrangement of a pair of molding wheels, having in their inner faces a semi-circular concave annular groove, the said wheels being so adjusted on their axis as to form an annular core at the junction of the two semicircular grooves, at the front edge of the wheels, and opening obliquely backward, so as to allow the ball of dough, when molded by the rotatory action of the wheels, to fall from the machine; that is, the left hand wheel having a rapid forward motion and the opposite wheel a slow backward motion, so as to produce a rolling and twisting of the ball of dough analogous to the manipulations of a workman in molding dough for butter crackers, and, third, the use of feed and guide boards for conveying and confining the dough in passing through the machine with suitable mechanical devices for propelling it. But to describe my invention more particularly I will refer to the accompanying drawings, forming a part of this schedule, the same letters of reference wherever they occur referring to the same parts.

Figure 1 is a view of the left side of the machine. Fig. 2 is a view of the opposite side of the machine. Fig. 3 is a plan view of the same. Fig. 4 is a vertical cut section of the machine through the dotted line $x, x$, Fig. 1. Fig. 5 is a detached plan view of the molding wheels. Fig. 6 is an inner face view of one of the molding wheels and guide boards for confining the ball of dough in the annular channel or groove. Fig. 7 is a cut section of the machine through the red lines $s, s$, Figs. 3 and 4.

Letter A, is the frame of the machine, and B, is the feed board, arranged on the upper and back side of the machine, for conveying the sheet of dough to and between a pair of feed rollers $C'$, and $C^2$. These rollers are arranged transversely of the machine, $C^2$, being placed below and behind the other at an angle of about 45°. In the middle of these rollers, transversely of their axis, is cut a semicircular groove, so that when their opposite edges meet they form a hollow core to form the dough into cylindrical strips as it passes between them. Below the feed roller $C'$, is placed a third roller D, having a similar semicircular groove, the edges of which rotate in contact with the edges of the groove in the feed roller $C^2$. In the channel or groove of the roller D, are four (or more or less as may be required) projecting fixed cutters E, E, &c., the faces of which are convex and of sufficient length to fill the cavity of the groove of the roller $C^2$, so as to cut the strip of dough into suitable lengths to form the cracker, when it is dropped upon a guide board F, arranged at the back of the machine, and having a tongue piece extending between the back edges of the wheels, and resting upon the inner circumference of the annular groove G, so as to convey it to and between the molding wheels H, and J, when it is carried forward by the rotatory motion of the wheels to form it into a ball of dough.

Letter K is a guide strip or board fitting between the front edges of the molding wheels to form the annular groove and prevent the dough from working out of the groove between edges of the wheels. These wheels are made of metal of any suitable diameter required. In their inner faces are cut concave annular grooves G.

Letters L, L, are bosses made beveling a little from the center of the wheels outward toward the inner edge of the annular groove and which is deeper than the outer edge of the annular groove, so that the oblique angle of the wheels brings the front edges together, or nearly so, to form an annular groove or hollow cone for rolling the dough.

Letters M, M, are the axis of the molding wheels, having on their outer ends cog wheels $N'$, and $N^2$. Letter $N'$, is on the left hand side of the machine and gears directly into a main driving wheel P, and communicates to the left hand side molding wheel a rapid forward motion to form the ball of dough and discharge it. On the opposite end of the main driving wheel shaft R, is a cog wheel S, that gears into an intermediate small carrying cog wheel T, and thence into a driving cog wheel N², on the end of the axis of the right hand side molding wheel, causing it to have a slow backward rotatory motion, so as to give a twisting rolling motion to the ball of dough as it passes through the molders to produce the peculiar effect found in butter crackers when worked by hand. Letter V, is a second intermediate cog wheel, gearing into the cog wheel S, on the driving shaft R, for communicating rotatory motion through the cog wheel W, to the cutting roller D, and thence through the cog wheel X, rotatory motion to the lower feed roller C², and by means of a cog wheel Y, on its journal, at the left hand side of the machine, a rotatory motion to the upper feed roller C′, thus completing the application of the motive power for operating the machine to mold and work dough for making butter crackers, and for other purposes.

Having now described my invention I will proceed to state what I desire to claim by Letters Patent of the United States.

What I claim is—

1. The use of the roller D, made substantially as set forth with cutters in its channel in combination with the feed rollers C′, and C², for forming and cutting dough into suitable shapes for making crackers substantially as set forth.

2. I also claim as new for rolling dough into ball, the conical or nearly disk form of the wheels H, and J, whereby they are made by their oblique position on their axis to combine a twisting and rolling motion, the rolling motion only having been heretofore employed in cylindrical grooved rollers.

PHINEAS EMMONS.

Witnesses present:
CHARLES L. BANITT,
A. SPENCER.